J. ALLOWAYS.
Wheel Plow.
No. 105,879.
Patented Aug. 2, 1870.
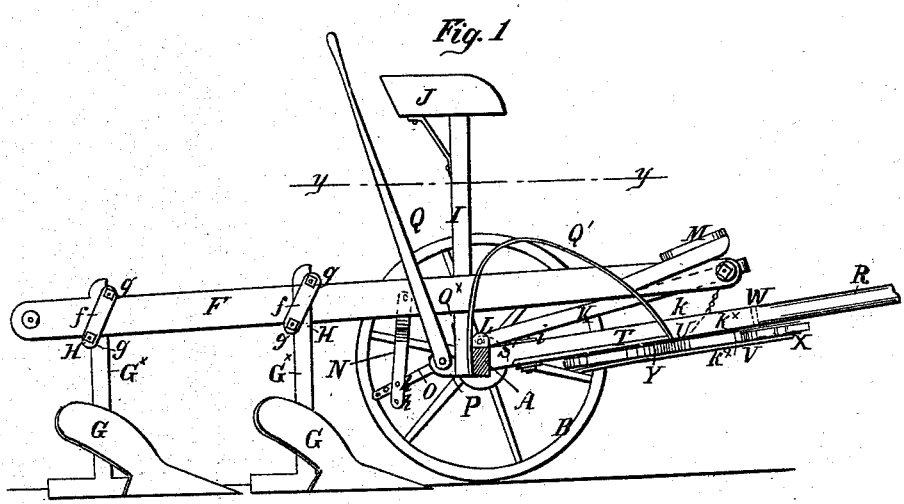
Fig. 1
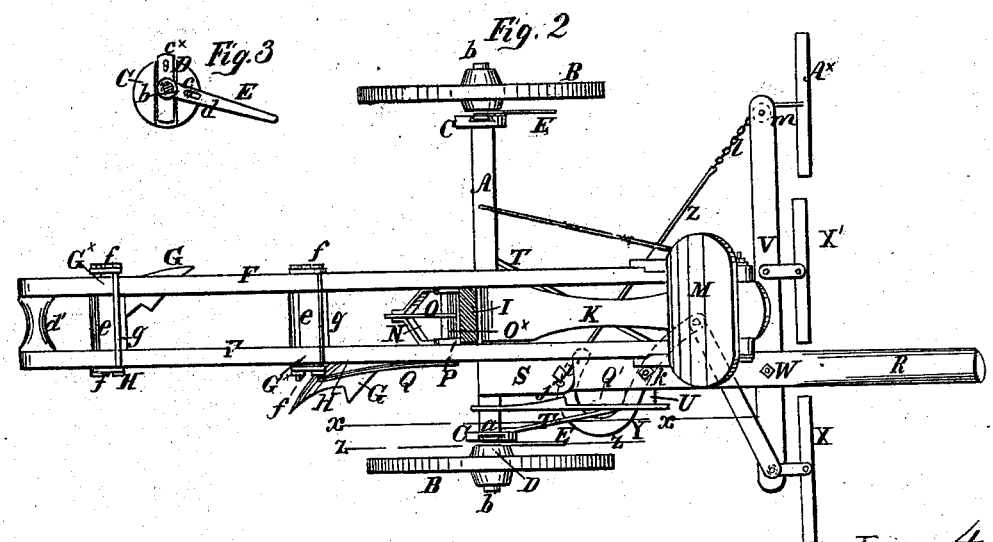
Fig. 3
Fig. 2
Witnesses:
H. C. Ashkettle
Wm. A. Morgan
Inventor:
Jno Alloways
per Murray & Co
attorneys

UNITED STATES PATENT OFFICE.

JOHN ALLOWAYS, OF DECATUR, ILLINOIS, ASSIGNOR TO HIMSELF AND W. CUMMINGS, OF SAME PLACE.

IMPROVEMENT IN GANG-PLOWS.

Specification forming part of Letters Patent No. 105,879, dated August 2, 1870.

*To all whom it may concern:*

Be it known that I, JOHN ALLOWAYS, of Decatur, in the county of Macon and State of Illinois, have invented a new and Improved Gang-Plow; and I do hereby declare that the following is a full, clear, and exact description thereof, which will enable those skilled in the art to make and use the same, reference being had to the accompanying drawing, forming part of this specification.

This invention relates to improvements in gang-plows; and consists in an improved construction and arrangement of devices for connecting the plow-beams with the axle, as hereinafter set forth.

In the accompanying sheet of drawing, Figure 1 is a side sectional view of my invention, taken in the line $x$ $x$, Fig. 2; Fig. 2, a longitudinal section of the same, taken in the line $y$ $y$, Fig. 1; Fig. 3, a transverse section of the axle of the machine, taken in the line $z$ $z$, Fig. 2.

Similar letters of reference indicate corresponding parts.

A represents the axle of the machine, having a wheel, B, at each end, which are attached to the axle as follows: To each end of the axle there is permanently secured a circular metal plate, C, which have a dovetail groove, $a$, made vertically in their outer or face sides to receive a slide, D. The slides D are allowed to work freely up and down in the grooves $a$, and said slides have arms $b$ projecting from them at right angles, on which arms the wheels B work. Each plate C has a lever, E, attached to it by a pin, $c$, which passes through an oblong slot, $d$, in the lever, the inner ends of said levers being fitted loosely on the arms $b$. (See Fig. 3.)

By this arrangement the axle A may be adjusted higher or lower, as desired, in order to regulate the depth of furrow made by the plows, the axle being held at any desired point within the scope of its adjusting movement by means of pins $c^x$ passing through the plates C and the slides D.

F F represent two plow-beams, which are parallel with each other, and are connected at their ends by a cross-bar, $d'$, and by two oblique or inclined bars, $e$ $e$, in front of $d'$. Each of these beams has a plow, G, attached to it by means of a clamp, H, formed of two plates, $f f$, connected by screw-bolts $g$ $g$, the plates $f$ being at the outer sides of the beams, and the bolts $g$ extending one across the upper and the other across the under surfaces of the beams. These clamps secure the plow-standards $G^x$ to the beams, the standards being inserted between the outer surfaces of the beams and the plates $f$, the standards being firmly clamped or held by screwing up the nuts of the bolts $g$, a bolt being at opposite sides of each standard, as shown in Fig. 1.

I represents the post of the driver's seat, which extends upward between the beams F F and has the driver's seat J upon it. The front ends of the beams F F are bolted to the front end of a bar, K, the inner end of which is bolted in a metal socket, L, secured on the axle at the foot of the seat-post I, the bolts which secure the front end of the bar to the plow-beams and the inner end in the socket forming joints to admit of a free up-and-down movement of the beams.

A foot-board, M, is attached to the front ends of the beams F F, and to the beams, at about their center, there is a pendant, N, attached by pivots, said pendant near its lower end being perforated with holes $h$, so that it may be connected by a bolt to an arm, O, on a shaft, $O^x$, which is fitted in a socket, P, attached to the rear side and lower end of the seat-post I.

To one end of the shaft $O^x$ a lever, Q, is attached, which extends upward within convenient reach of the driver on seat J, and this lever when shoved forward is brought by the side of an arched bar, $Q'$, having a notch in it to serve as a catch for the lever to hold the same. When the lever Q is thus shoved forward and retained, the plows are elevated above the surface of the ground, and in order to raise the plows out of the ground the lever Q is shoved gently forward, which causes the beams F F to be raised and the plows to run out of the ground, the machine being in motion and the plows entirely out of the ground when the lever Q reaches the notch in the arched bar $Q'$.

In lowering the plows into the ground the front ends of the beams F F are depressed by the action of the driver's feet on the foot-board M, which causes the points of the plows to incline downward, and, the lever Q being then released from the bar Q', the beams F F descend and the plows enter the ground points foremost.

It will be seen that the way in which the plow-beams F are attached to the axle admits of the latter rising and falling with the wheels as the latter pass over uneven surfaces without affecting the depth of the penetration of the plows in the earth, and consequently the furrows will have a uniform depth in the plowing of uneven ground.

R represents the draft-pole, the rear end of which is bolted to a plate, S, which projects from the socket L, the socket and plate being in one piece, and the edges of both lapping down over the sides of the axle A to admit of a firm attachment of the plate and socket to the axle, the bolt $i$, which secures the draft-pole to the plate S, passing through an oblong slot, $j$, in said plate, which admits of the pole being adjusted laterally to give the plows more or less land, as desired.

The pole is braced by rods T T from the axle A, the front ends of said rods being attached to a plate, U, having an oblong slot in it, through which and the draft-pole a bolt, $k$, passes, the oblong slot in plate U being for the same purpose as the oblong slot $j$ in plate S.

V is a splinter-bar or triple-tree, which is secured at some distance one side of its center to the draft-pole R by a bolt, W.

The triple-tree has two whiffletrees, X X', attached to it, at equal distances from the bolt W, one at each side of the draft-pole, as shown in Fig. 2.

The short arm of the triple-tree is connected by bars $k^\times k^\times$ to a curved lever, Y, which is pivoted to the under side of the draft-pole R, the rear end of the lever Y having a rod, Z, attached, with a chain, $l$, at its outer end, the chain passing around a pulley, $m$, in the end of the long arm of the triple-tree, and having a whiffletree, $A^\times$, secured to its end.

By this arrangement the draft or pull of the three horses is equalized, each animal being made to perform his share of the work.

I claim as new and desire to secure by Letters Patent—

The arrangement, with relation to the beams F F, shaft O, and axle A, of the pivoted pendant N and arm O, adjustably connected at their lower or outer ends, as and for the purpose specified.

JOHN ALLOWAYS.

Witnesses:
A. D. RISDON,
JOSEPH BOYER.